US009263969B2

(12) United States Patent  
Eckel et al.

(10) Patent No.: US 9,263,969 B2  
(45) Date of Patent: Feb. 16, 2016

(54) DOUBLE MODULE FOR A MODULAR MULTI-STAGE CONVERTER

(75) Inventors: Hans-Günter Eckel, Rostock (DE); Herbert Gambach, Uttenreuth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 502 days.

(21) Appl. No.: 13/703,425

(22) PCT Filed: Jun. 11, 2010

(86) PCT No.: PCT/EP2010/058234  
§ 371 (c)(1),  
(2), (4) Date: Dec. 19, 2012

(87) PCT Pub. No.: WO2011/154049  
PCT Pub. Date: Dec. 15, 2011

(65) Prior Publication Data  
US 2013/0082534 A1    Apr. 4, 2013

(51) Int. Cl.  
*H02M 7/5387*    (2007.01)  
*H02M 1/32*    (2007.01)  
(Continued)

(52) U.S. Cl.  
CPC .............. *H02M 7/5387* (2013.01); *H02M 1/32* (2013.01); *H02M 7/487* (2013.01); *H02M 7/7575* (2013.01); *H02M 2007/4835* (2013.01); *Y02E 60/60* (2013.01); *Y10T 307/707* (2015.04)

(58) Field of Classification Search  
CPC ..... H02M 1/32; H02M 7/5387; H02M 7/487; H02M 7/7575; H02M 2007/4835; Y02E 60/60  
USPC ......................................................... 307/113  
See application file for complete search history.

(56) References Cited

U.S. PATENT DOCUMENTS 4,855,893 A * 8/1989 Kratz ............................. 363/136  
6,058,031 A * 5/2000 Lyons ................... H02M 7/487  
363/132

(Continued)

FOREIGN PATENT DOCUMENTS

EP    1 920 526 B1    2/2010

OTHER PUBLICATIONS

Bhattacharya, S., et al., "Series Connected IGCT based High Power Three-Level Neutral Point Clamped Voltage Source Inverter Pole for FACTS Applications", Jan. 2005, pp. 2315-2321, IEEE 36th Power Electronics Specialists Conference, Piscataway, NJ, USA, ISBN: 978-0-7803-9033-1.

(Continued)

*Primary Examiner* — Scott Bauer  
(74) *Attorney, Agent, or Firm* — Laurence Greenberg; Werner Stemer; Ralph Locher

(57) ABSTRACT

A submodule for a high-voltage converter with reduced risk of cross-ignition includes first and second series-connected energy storage devices, first and second semiconductor series circuits connected in parallel with the energy storage devices, respectively, and having first and second, and respectively third and fourth, switched power semiconductor switching units. A first terminal connects to a first potential point between the first and second switching units, a second terminal connects to a second potential point between the third and fourth switching units. A connecting switching unit is connected between the first and second semiconductor series circuits. A first connecting branch with a first diode connects the first potential point and the potential point between the energy storage devices. A second connecting branch with a second diode connects the second potential point and the potential point between the energy storage devices. The connecting branch diodes are oriented in mutually opposite directions.

9 Claims, 2 Drawing Sheets

(51) Int. Cl.
  *H02M 7/487* (2007.01)
  *H02M 7/757* (2006.01)
  *H02M 7/483* (2007.01)

(56) References Cited

U.S. PATENT DOCUMENTS

| | | | |
|---|---|---|---|
| 7,219,673 B2 * | 5/2007 | Lemak | 363/71 |
| 7,577,008 B2 | 8/2009 | Hiller | |
| 2008/0239772 A1 * | 10/2008 | Oraw | H02M 3/07 363/60 |
| 2012/0163057 A1 * | 6/2012 | Permuy | H02M 7/487 363/131 |

OTHER PUBLICATIONS

Sinha, G., et al., "Fault protection in a multilevel inverter implementation of a static condenser", Conference Record of the 1995 IEEE Industry Applications Conference, Thirtieth IAS Annual Meeting, IAS 1995, Oct. 8-12, 1995, Orlando, Florida, USA, URL: http://lipo.ece.wisc.edu/1995%20pubs/95-52.PDF.

* cited by examiner

DOUBLE MODULE FOR A MODULAR MULTI-STAGE CONVERTER

BACKGROUND OF THE INVENTION

Field of the Invention

The invention relates to a submodule for a converter in the high-voltage range comprising a first energy store, a first semiconductor series circuit comprising a first and a second power semiconductor switching unit which can be turned on and off, said first semiconductor series circuit being connected in parallel with the first energy store, a first connecting terminal, which is connected to the potential point between the first and second power semiconductor switching units, a second energy store, which is arranged in series with the first energy store, a second semiconductor series circuit comprising a third and fourth power semiconductor switching unit which can be turned on and off, said second semiconductor series circuit being arranged in parallel with the second energy store, and a second connecting terminal, which is connected to the potential point between the third and fourth power semiconductor units.

The invention furthermore relates to a converter for the high-voltage range for converting an electric voltage or an electric current comprising phase modules which extend between two DC voltage connections and in each case comprise an AC voltage connection for connecting a phase to an DC voltage power supply system, wherein at least one of the phase modules comprises a series circuit formed by two-pole submodules.

Such a submodule and such a converter are already known from EP 1 920 526 B1. The converter described therein is a so-called modular multi-stage converter and has phase module components which extend between two DC voltage connections polarized in opposite directions and in each case comprise an AC voltage connection for connecting a phase of an AC voltage power supply system. Between its AC voltage connection and each of its DC voltage connections, each phase module component forms two valve branches. Each valve branch in turn has a series circuit comprising two-pole submodules. Each submodule is equipped with two energy stores connected in series with one another. In this case, each energy store is arranged in parallel with a first or respectively second series circuit comprising in each case two drivable power semiconductors, with which a respective freewheeling diode is connected in parallel in the opposite direction. These power semiconductor switches which can be turned on and off are, for example, IGBTs, GTOs or the like. The two connecting terminals of the submodule are in each case connected to a potential point lying between the power semiconductor switches of the first and respectively second semiconductor series circuit. Furthermore, a center tap or connection branch is disclosed which connects the potential point between the energy stores to the potential point between the semiconductor series circuits. The power semiconductor switches which can be turned on or off are connected to a closed-loop control, such that the voltage dropped across the energy store or the voltage dropped across both energy stores or else a zero voltage can be generated in the output terminals.

The previously known submodule has various advantages over a simple submodule comprising just two power semiconductor switches which can be turned off and one energy store. Thus, the voltage of a submodule that is dropped between the connecting terminals can be increased, such that the number of submodules can be reduced in high-voltage applications. This facilitates the closed-loop control of the converter, for example. As a result of the increased voltage at the terminals, however, the safety requirements imposed on the individual submodules also increase. This is because the risk of so-called cross-ignitions is increased, which occur if the power semiconductor switches arranged between the connecting terminals break down, that is to say become conducting. Such a short circuit at the connecting terminals results in a high short-circuit current that can cause irreparable damage to the submodule.

BRIEF SUMMARY OF THE INVENTION

Therefore, it is an object of the invention to reduce the risk of the occurrence of cross-ignitions.

The invention achieves this object by means of a connection switching unit, which is arranged between the first semiconductor series circuit and the second semiconductor series circuit, a first connection branch, which comprises a first connection branch diode and connects the potential point between the connection switching unit and the second power semiconductor switching unit to the potential point between the energy stores, a second connection branch, which comprises a second connection branch diode and connects the potential point between the connection switching unit and the third power semiconductor switching unit to the potential point between the energy store units, wherein the first connection branch diode and the second connection branch diode are oriented in opposite directions with respect to one another.

Proceeding from the converter mentioned in the introduction, the invention achieves said object by using a submodule mentioned above.

According to the invention, the submodule of a modular multi-stage converter, said submodule being designed as a so-called double module, does not—in contrast to the prior art—comprise four power semiconductor switching units. According to the invention, the number of power semiconductor switching units has been increased by one power semiconductor switching unit, designated as a connection switching unit. Consequently, in the context of the invention, a series circuit formed by a total of five power semiconductor switching units is present, which is arranged in parallel with the two energy stores, which are likewise connected in series. The connecting terminals are connected to the potential point between the first and second and respectively fourth and fifth power semiconductor switching units. In this way, including the connection switching unit a total of three power semiconductor switching units are arranged between the connecting terminals. The probability of all three power semiconductor switching units breaking down simultaneously is virtually ruled out according to the invention. The risk of cross-ignitions is therefore reduced according to the invention.

From the potential point between the second power semiconductor switching unit and the connection switching unit and from the potential point between the connection switching unit and the fourth power semiconductor switching unit, a respective connection branch extends toward the potential point between the series-connected energy stores. In this case, connection branches each comprise a connection branch diode, wherein the connection branch diodes are oriented in opposite directions with respect to one another. In the case of a fault, the connection branch diodes prevent an undesired current flow as a result of the discharge of one of the energy stores. A submodule with which high short-circuit currents can be reliably avoided even upon the failure of one of the power semiconductor switching units is provided in this way.

In accordance with one preferred configuration of the invention, the first and second connecting terminals are connected to one another via at least one semiconductor bridge switch. The semiconductor bridge switch serves for bridging the submodule in the case of high surge currents.

Expediently, a mechanical bridge switch is additionally provided between the first and second connecting terminals. The mechanical bridge switch serves for bridging the submodule in the case of a fault. The submodule is usually part of a series circuit of a phase module of a converter. As a result of the bridging of a faulty submodule, the phase module can continue to be operated. Only the faulty submodule has to be exchanged after it has been bridged. The mechanical switch has a sufficiently high current-carrying capacity, such that destruction of the semiconductor bridge switch is avoided even if the converter continues to be operated for a relatively long time.

Expediently, current limiters are arranged in the first and second connection branches. The current limiters reduce a current flow if the control of the power semiconductor switching units is not exactly synchronized. Expediently, the current limiters are ohmic resistors.

In accordance with one preferred configuration of the invention, each power semiconductor switching unit and the connection switching unit in each case comprise a power semiconductor switch which can be turned on and off and also a freewheeling diode arranged in parallel and in the opposite direction with respect thereto. Power semiconductor switches which can be turned on and off are, for example, IGBTs, GTOs or the like. IGBTs are changed over, by corresponding control signals that they receive from a control unit, from a forward position, in which they enable a current flowing in their forward direction, to a locking position, in which a current flowing is interrupted. A freewheeling diode in the opposite direction is arranged in parallel with the power semiconductor switch which can be turned on and off, such that high voltage spikes when turning off currents through the power semiconductor which can be turned on and off are avoided.

In a configuration of the invention that deviates from this, the power semiconductor switching unit and the connection unit are in each case reverse conducting power semiconductor switches which can be turned on and off. Reverse conducting power semiconductor switches, such as reverse conducting IGBTs, for example, are known to the person skilled in the art, and so they need not be discussed in greater detail at this juncture. The advantage when using a reverse conducting power semiconductor switch can be seen in the fact that the freewheeling diode in parallel in the opposite direction can be obviated.

In the context of the invention, power semiconductor switch is taken to mean a commercially available power semiconductor switch, these currently having a dielectric strength of 3.3 kV or even 6.5 kV. Power semiconductor switches generally comprise a housing in which power semiconductor chips are connected to one another, for example via bonding wires or via surface contact. Such power semiconductor switches are likewise known to the person skilled in the art, however.

Further expedient configurations and advantages of the invention are the subject of the following description of exemplary embodiments of the invention with reference to the figures of the drawing, wherein identical reference signs refer to identically acting component parts, and wherein

DESCRIPTION OF THE INVENTION

Figure 1:
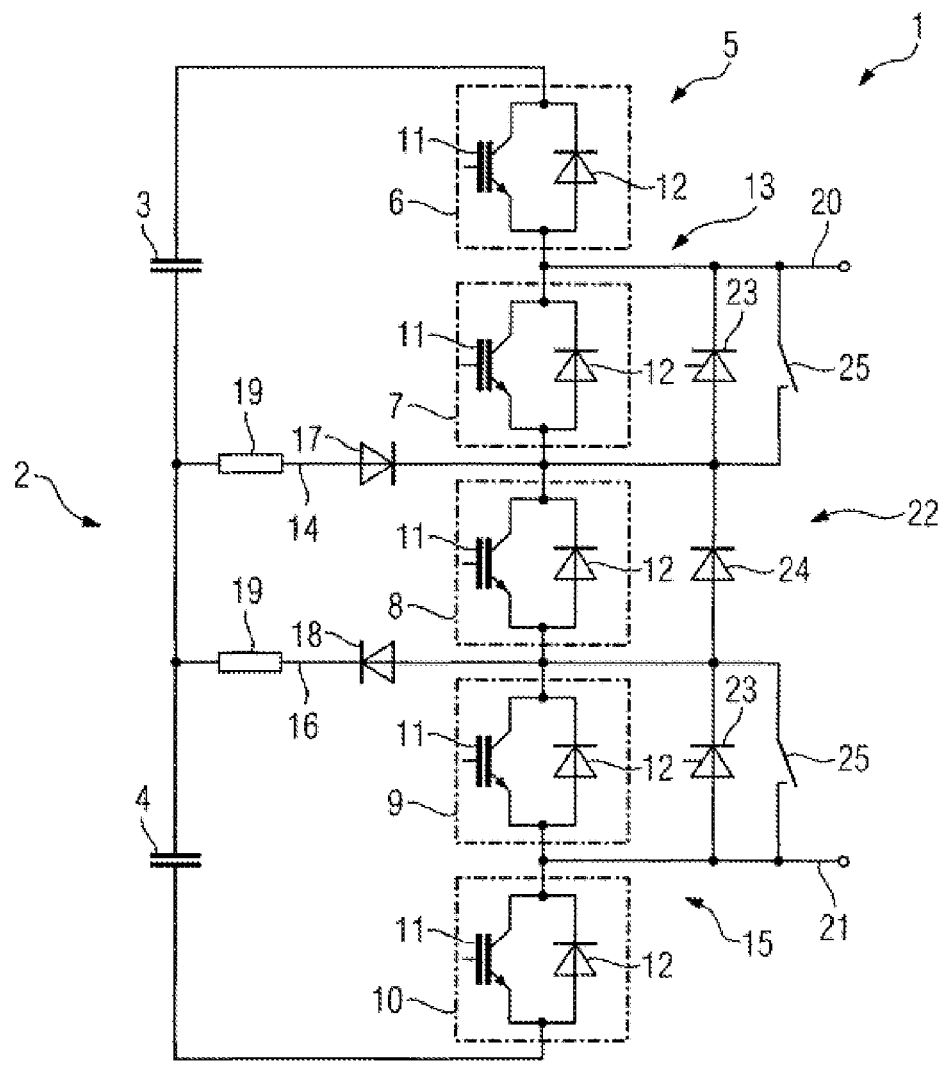
FIG. 1 illustrates a first exemplary embodiment of a submodule according to the invention and FIG. 2 illustrates a further exemplary embodiment of the submodule according to the invention.

FIG. 1 shows an exemplary embodiment of the submodule 1 according to the invention. The submodule 1 comprises an energy store series circuit 2 comprising a first energy store 3 and a second energy store 4. Provided in parallel with the energy store series circuit 2 is an overall semiconductor series circuit 5 consisting of a first power semiconductor switching unit 6, a second power semiconductor switching unit 7, a connection switching unit 8, a third power semiconductor switching unit 9 and a fourth power semiconductor switching unit 10. Each power semiconductor switching unit 6, 7, 8, 9 and the connection switching unit 8 comprise an IGBT 11 as power semiconductor switch which can be turned on and off, which has a forward direction identified by an arrow. By means of corresponding control signals from a control unit (not illustrated in the figure), the respective IGBT 11 can be changed over from its forward position to its blocking position. A freewheeling diode 12 is arranged in parallel with each IGBT 11, said freewheeling diode being oriented in the opposite direction with respect to the forward direction of said IGBT. The first power semiconductor switching unit 6 and the second power semiconductor switching unit 7 form a first semiconductor series circuit 13, which is connected to the potential point between the energy stores 3 and 4 via a first connection branch 14. The first semiconductor series circuit is thus connected in parallel with the first energy store 3. The connection branch 14 connects the potential point between the energy stores 3 and 4 to the potential point between the first series circuit 13 and the connection switching unit 8.

The connection switching units 9 and 10 form a second semiconductor series circuit 15, which is connected to the potential point between the energy stores 3 and 4 via a second connection branch 16. The second connection branch 16 thus connects the potential point between the energy stores 3 and 4 to the potential point between the second semiconductor series circuit 15 and the connection switching unit 8.

The first connection branch 14 comprises a first connection branch diode 17 and the second connection branch 16 comprises a second connection branch diode 18, which is oriented in the opposite direction with respect to the first connection branch diode 17. Furthermore, an ohmic resistor 19 is arranged in each connection branch 14 and 16, respectively.

The submodule 1 is of two-pole design and thus comprises a first connecting terminal 20 and a second connecting terminal 21. The first connecting terminal 20 is connected to the potential point between the first power semiconductor switching unit 6 and the second power semiconductor switching unit 7. The second connecting terminal 21 is at the potential between the third power semiconductor switching unit 9 and the fourth power semiconductor switching unit 10.

In the case of a fault, the connecting terminals 20 and 21 can be bridged by a series circuit 22 consisting of two drivable power semiconductors 23 and a diode 24 arranged therebetween. The drivable power semiconductor switches 23 bridge the second and respectively third power semiconductor switching units. A respective mechanical switch 25 is connected in parallel with them.

The connection switching unit 8 is turned on and off jointly with the power semiconductor switching units 7 and 9. This also applies to the power semiconductor switching units 6 and 10. Consequently, the capacitor voltage jointly dropped across both energy stores 3 and 4 or else a zero voltage is dropped across the connecting terminals 20 and 21.

If the two outer power semiconductor switching units, that is to say the power semiconductor switching units 6 and 10, are always switched on at the same time and if the inner power semiconductor switching units 7, 8 and 9 are always switched simultaneously, the connection branches 14 and 16 ideally carry no current. However, such an exact temporal synchronization is generally not possible, thus resulting in slight deviations with regard to the switching times and therefore a current flow via the connection branches 14 and 16. This current flow is limited by the ohmic resistors 19.

It can be discerned from FIG. 1 that a total of three power semiconductor switching units 7, 8 and 9 are arranged between the connecting terminals 20 and 21. A simultaneous breakdown or failure of all three power semiconductor switching units is unlikely, and so a short circuit between the connecting terminals 20, 21, that is to say cross-ignition of the submodule according to the invention, is avoided to the greatest possible extent. The connection branch diodes 17, 18 prevent an undesired discharge of the capacitors 3 or 4 in the event of failure of one of the power semiconductor switching units 7 or 9.

Figure 2:
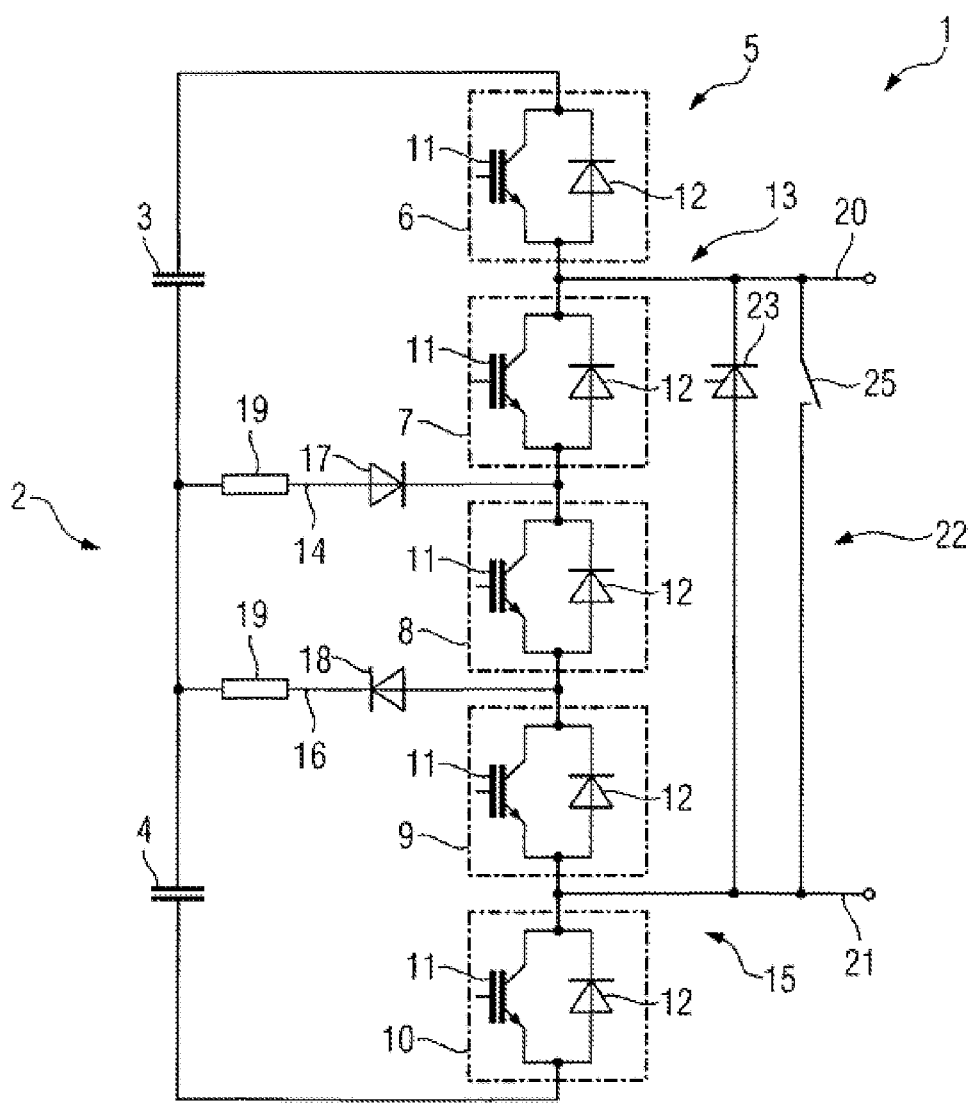

FIG. 2 shows a further exemplary embodiment of the submodule 1 according to the invention, which substantially corresponds to the submodule 1 shown in FIG. 1. In contrast to the exemplary embodiments illustrated in FIG. 1, however, only one semiconductor switch 23 is provided, which directly connects the connecting terminals 20 and 21 to one another. A mechanical short-circuiting switch 25 is again provided in parallel with the semiconductor switch 23.

The invention claimed is:

1. A submodule for a high-voltage converter, the submodule comprising:
   a first energy storage device;
   a first semiconductor series circuit connected in parallel with said first energy storage device, said first semiconductor series circuit having first and second power semiconductor switching units that can be turned on and off;
   a first connecting terminal connected to a potential point between said first and second power semiconductor switching units;
   a second energy storage device connected in series with said first energy storage device;
   a second semiconductor series circuit connected in parallel with said second energy storage device, said second semiconductor series circuit having third and fourth power semiconductor switching units that can be turned on and off;
   a second connecting terminal connected to a potential point between said third and fourth power semiconductor switching units;
   a connection switching unit connected between said first semiconductor series circuit and said second semiconductor series circuit;
   a first connection branch including a first connection branch diode connecting a potential point between said connection switching unit and said second power semiconductor switching unit to a potential point between said first and second energy storage devices;
   a second connection branch including a second connection branch diode connecting a potential point between said connection switching unit and said third power semiconductor switching unit to a potential point between said first and second energy storage devices; and
   said first connection branch diode and said second connection branch diode being oriented in opposite directions with respect to one another.

2. The submodule according to claim 1, which comprises at least one semiconductor bridge switch connecting said first and second connecting terminals to one another.

3. The submodule according to claim 2, which further comprises at least one mechanical bridge switch connecting said first and second connecting terminals to one another.

4. The submodule according to claim 1, which comprises current limiters disposed in said first and second connection branches.

5. The submodule according to claim 4, wherein said current limiters are ohmic resistors.

6. The submodule according to claim 1, wherein each said power semiconductor switching unit and said connection switching unit each include a power semiconductor switch that can be turned on and off and also a freewheeling diode connected in parallel, and in opposite direction, with said power semiconductor switch.

7. The submodule according to claim 1, wherein each of said power semiconductor switching units and said connection switching unit are reverse conducting power semiconductor switches that can be turned on and off.

8. A converter for a high-voltage range for converting an electric voltage or an electric current, the converter comprising:
   phase modules extending between two DC voltage terminals and each having an AC voltage connection for connecting a phase to an AC voltage power supply system;
   at least one of said phase modules having a series circuit formed by two-pole submodules, with at least one submodule according to claim 1.

9. A submodule for a high-voltage converter, the submodule comprising:
   a first energy storage device;
   a first semiconductor series circuit connected in parallel with said first energy storage device, said first semiconductor series circuit having first and second power semiconductor switching units that can be turned on and off;
   a first connecting terminal connected to a potential point between said first and second power semiconductor switching units;
   a second energy storage device connected in series with said first energy storage device;
   a second semiconductor series circuit connected in parallel with said second energy storage device, said second semiconductor series circuit having third and fourth power semiconductor switching units that can be turned on and off;
   a second connecting terminal connected to a potential point between said third and fourth power semiconductor switching units;
   a connection switching unit connected between said first semiconductor series circuit and said second semiconductor series circuit;
   a first connection branch including a first connection branch diode connecting a potential point between said connection switching unit and said second power semiconductor switching unit to a potential point between said first and second energy storage devices;
   a second connection branch including a second connection branch diode connecting a potential point between said connection switching unit and said third power semiconductor switching unit to a potential point between said first and second energy storage devices;
   said first connection branch diode and said second connection branch diode being oriented in opposite directions with respect to one another; and at least one switch selected from the group consisting of a semiconductor bridge switch and a mechanical bridge switch connecting said first and second connecting terminals to one another.

* * * * *